: US005999174A

United States Patent [19]
Bormann et al.

[11] Patent Number: 5,999,174
[45] Date of Patent: Dec. 7, 1999

[54] REUSABLE SPARING CELL SOFTWARE COMPONENT FOR A GRAPHICAL USER INTERFACE

[75] Inventors: Richard J. Bormann, Howell; Ann C. Fulop, Aberdeen, both of N.J.; Steven J. Shute, Yardley, Pa.; Radakichenane Vengatatry, Edison; Phillip A. Weeks, Little Silver, both of N.J.

[73] Assignee: AT&T Corporation, New York, N.Y.

[21] Appl. No.: 08/986,218

[22] Filed: Dec. 5, 1997

Related U.S. Application Data

[60] Provisional application No. 60/051,568, Jul. 2, 1997.
[51] Int. Cl.⁶ .................................................. G06F 3/00
[52] U.S. Cl. ........................................ 345/334; 345/348
[58] Field of Search .................................. 345/326, 333, 345/340, 334, 335, 339, 348

[56] References Cited

U.S. PATENT DOCUMENTS

| | | | |
|---|---|---|---|
| 5,226,120 | 7/1993 | Brown et al. ............................ | 395/200 |
| 5,261,044 | 11/1993 | Dev et al. ................................ | 395/159 |
| 5,285,494 | 2/1994 | Sprechter et al. ........................ | 379/59 |
| 5,295,244 | 3/1994 | Dev et al. ................................ | 395/161 |
| 5,394,522 | 2/1995 | Sanchez-Frank et al. .............. | 395/159 |
| 5,483,631 | 1/1996 | Nagai et al. ............................. | 395/155 |
| 5,521,913 | 5/1996 | Gridley .................................. | 370/58.2 |
| 5,548,722 | 8/1996 | Jalalian et al. ........................ | 395/200.1 |
| 5,600,778 | 2/1997 | Swanson et al. ........................ | 345/333 |
| 5,606,664 | 2/1997 | Brown et al. .......................... | 395/200.1 |
| 5,627,964 | 5/1997 | Reynolds et al. ....................... | 395/183 |
| 5,627,978 | 5/1997 | Altom et al. ............................ | 395/330 |
| 5,717,877 | 2/1998 | Orton et al. ............................ | 345/326 |
| 5,724,589 | 3/1998 | Wold ...................................... | 395/701 |
| 5,751,965 | 5/1998 | Mayo et al. ........................ | 395/200.54 |
| 5,768,614 | 6/1998 | Takagi et al. ........................... | 395/821 |
| 5,793,845 | 8/1998 | Hollywood et al. ...................... | 379/88 |
| 5,799,181 | 8/1998 | Tabuchi et al. ......................... | 395/590 |
| 5,819,042 | 10/1998 | Hansen .............................. | 395/200.52 |

Primary Examiner—John E. Breene
Assistant Examiner—Tadesse Hailu
Attorney, Agent, or Firm—Kenyon & Kenyon

[57] ABSTRACT

A sparing cell GUI component that when displayed has a first interior portion of a first color corresponding to a first state information and a second interior portion of a second color corresponding to a second state information. The sparing cell can be associated with a GUI component to enable construction of a first set of instructions.

24 Claims, 2 Drawing Sheets

| | | |
|---|---|---|
| 1st PARTIAL CELL COLOR | YELLOW | 1000 |
| 2nd PARTIAL CELL COLOR | GREEN | 1005 |
| DIMENSION | | |
| X | 75 | 1010 |
| Y | 167 | 1015 |
| WIDTH | 75 | 1020 |
| HEIGHT | 75 | 1025 |
| FOREGROUND | BLACK | 1030 |
| HIGHLIGHT | TRUE | 1035 |
| LABEL 1 | CP 01 | 1040 |
| LABEL 2 | ACT | 1045 |
| LABEL 3 | | 1050 |

| 1st PARTIAL CELL COLOR | YELLOW | 1000 |
|---|---|---|
| 2nd PARTIAL CELL COLOR | GREEN | 1005 |
| DIMENSION | | |
| X | 75 | 1010 |
| Y | 167 | 1015 |
| WIDTH | 75 | 1020 |
| HEIGHT | 75 | 1025 |
| FOREGROUND | BLACK | 1030 |
| HIGHLIGHT | TRUE | 1035 |
| LABEL 1 | CP 01 | 1040 |
| LABEL 2 | ACT | 1045 |
| LABEL 3 | | 1050 |

REUSABLE SPARING CELL SOFTWARE COMPONENT FOR A GRAPHICAL USER INTERFACE

CROSS-REFERENCE TO A RELATED PATENT APPLICATIONS

This patent application claims the benefit of U.S. Provisional Application No. 60/051,568 entitled Graphical User Interfaces and Reusable Java Components For Use With A Distributed Platform Switch, filed on Jul. 2, 1997.

This patent application is related to the following commonly assigned U.S. patent applications with the same inventors: A Method And Apparatus for Using a Graphical User Interface (GUI) as the Interface to a Distributed Platform Switch, Ser. No. 08/985,862, filed Dec. 5, 1997; A Method and Apparatus for Supervising a Distributed Platform Switch Through Graphical Representations, Ser. No. 08/985,866, filed Dec. 5, 1997; A Method And Apparatus For Supervising A Processor Within A Distributed Platform Switch Through Graphical Representations, Ser. No. 08/986,220, filed Dec. 5, 1997; Reusable Software Components for a Graphical User Interface for a Distributed Network Switch, Ser. No. 08/985,775, filed Dec. 5, 1997; A Reusable Light-Emitting Diode (LED) Canvas Software Component For A Graphical User Interface, Ser. No. 08/986,219, filed Dec. 5, 1997; and A Reusable Reversible Progress Indicator Software Component For A Graphical User Interface, Ser. No. 08/985,865, filed Dec. 5, 1997.

FIELD OF THE INVENTION

The present invention relates generally to a reusable software component which can assist in the application development of the graphical user interface.

BACKGROUND

Software-prototype developers typically need to rapidly design, develop and alter software code to meet changing requirements. The lack of software tools to assist software-prototype developers in a rapid, application-development environment is a driving force behind the creation of reusable components. Reusable components allow for the packaging of specific functionality into easy to use, abstract, reusable, standardized code.

For example, reusable standardized code can be developed with an object-oriented language, such as the Java programming language. The Java programming language comprises classes and objects. A class is a collection of data and methods (i.e., procedures) that operate on that data. An object is a specific embodiment of a particular class as defined by specific values of the data.

Classes can be combined to create packages. Classes can be selected for a particular package because the classes have related functionality and/or can synergistically assist the software developer in developing a particular type of software. For example, Java provides a set of packages to create graphical user interfaces (GUIs). These packages are collectively known as the Abstract Windows Toolkit (AWT). More specifically, one of the Java AWT packages includes such classes as the Checkbox, the Canvas, the Dialog, the Scrollbar, and the Button. When discussing software for a GUI, the terms "GUI components" can be used to refer to both the class and/or the associated object. In other words, the GUI component "Checkbox" can refer to the Checkbox class and/or to a particular checkbox embodiment.

The GUI components of known software tools and packages, however, do not address all situations needed for a GUI. For example, the GUI components of the known software tools and packages often are not designed to easily represent certain types of physical equipment.

SUMMARY OF THE INVENTION

The present invention allows a software developer to represent a sparing cell within a GUI by using a sparing cell GUI component.

The present invention allows a software developer to convey state information using a sparing cell GUI component.

A graphical user interface (GUI) can be developed by loading a sparing cell GUI component that enables display of a first interior portion of a first color corresponding to a first state information and a second interior portion of a second color corresponding to a second state information. State information can include, for example, status information and alarm information. The sparing cell GUI component can be associated with another GUI component. A first set of instructions can be constructed from the associated sparing cell GUI component and the GUI component. The first set of instructions can be provided to a remote processor. At the remote processor, the GUI can be constructed using the first set of instructions.

The sparing cell GUI component can dynamically represent changes in the state information. The first set of instructions can be interpreted at the workstation to create a second set of instructions comprising machine codes specific to the remote processor.

A computer-readable medium has stored thereon a sparing cell GUI component that enables display of a first interior portion of a first color corresponding to a first state information and a second interior portion of a second color corresponding to a second state information. The computer-readable medium further has stored thereon instructions for enabling construction of a graphical user interface (GUI). The instructions which, when executed by a processor, cause the processor to associate the sparing cell GUI component with a GUI component to enable construction of the GUI in the form of a second set of instructions.

The sparing cell GUI component can be based in Java computer language. The GUI can be in the form of a Java applet or a Java application. The GUI can be byte-codes for Java Virtual Machine located at a remote processor.

DETAILED DESCRIPTION

Figures 1A, 1B:
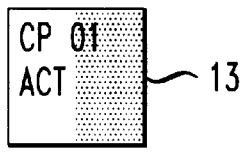
FIG. 1A shows a Sparing Cell with an 2N sparing strategy object that allows for the GUI representation of two related entities, according to an embodiment of the present invention.
FIG. 1B lists the property settings corresponding to the Sparing Cell shown in FIG. 1A, according to an embodiment of the present invention.

FIG. 1A shows a Sparing Cell with a 2N sparing strategy object that allows for the GUI representation of two related entities, according to an embodiment of the present invention. Sparing Cell 13 can indicate the status of two related entities such as, for example, a processor and its spare of a distributed switch element.

Figure 2:
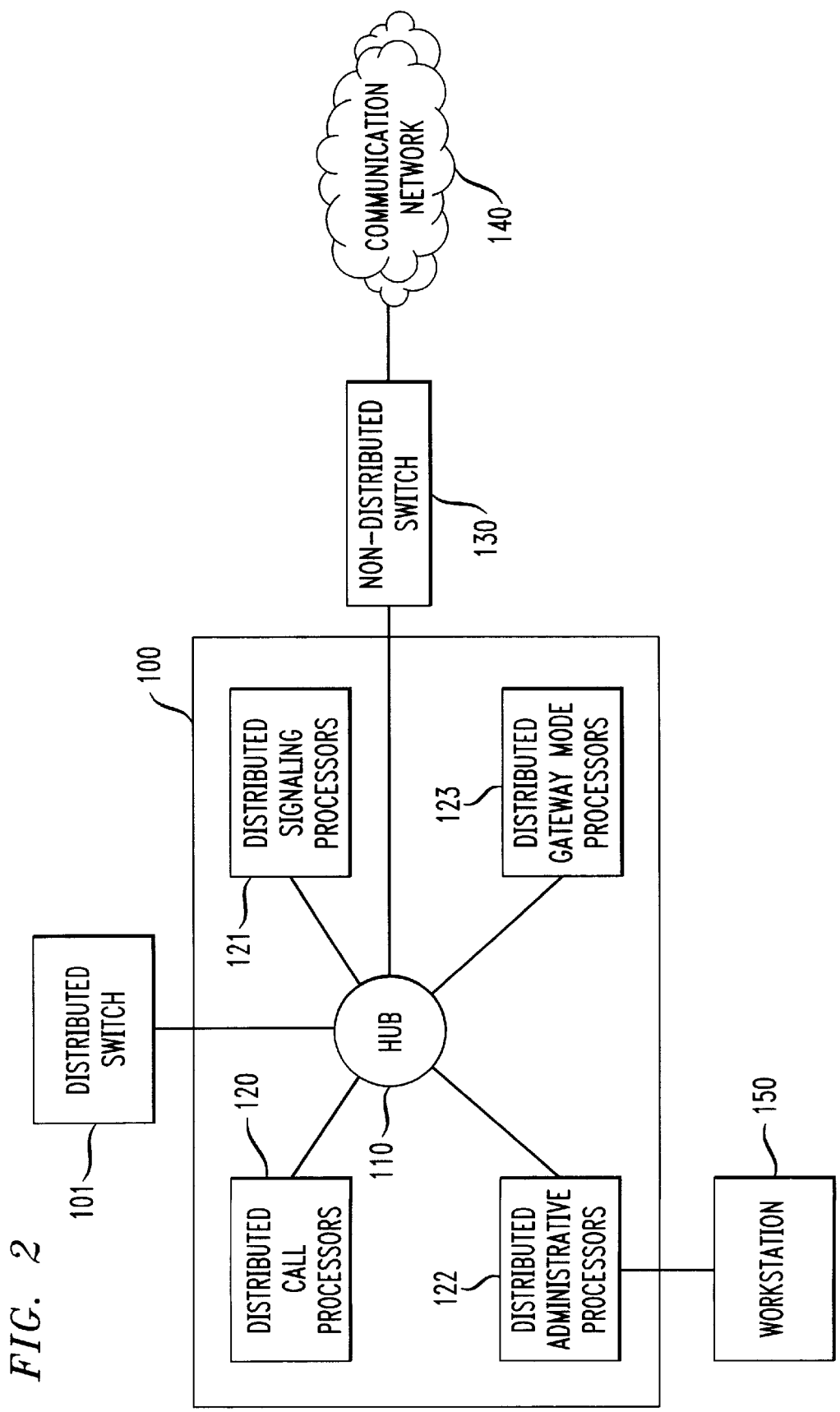
FIG. 2 shows a distributed switch having a network of distributed processors for which embodiment of the present invention can be used.

FIG. 2 shows a distributed switch having a network of distributed processors for which embodiment of the present invention can be used. FIG. 2 is for illustrative purposes only and in no way limits the type of system configurations within which embodiments of the present invention can be used.

Distributed switch 100 comprises hub 110, distributed call processors 120, distributed signaling processors 121, distributed administration processors 122, and distributed gateway node processors 123. Hub 110 connects distributed processors 120 through 123. Hub 110 also connects distributed switch 100 to non-distributed switch 130. Non-distributed switch 130 is connected to communications network 140. Distributed switch 130 can also be connected to another distributed switch, such as distributed switch 101. Workstation 150 can be connected to one administrative processor from distributed administrative processors 122. Alternatively, workstation 150 can be included within distributed switch 100 rather than remotely connected to distributed switch 100. In the example shown in FIG. 2, a processor from distributed administration processors 122 can act as the local processor and workstation 150 can act as the remote processor. The commonly assigned patent application entitled A METHOD AND APPARATUS FOR USING A GRAPHICAL USER INTERFACE (GUI) AS THE INTERFACE TO A DISTRIBUTED PLATFORM SWITCH (Attorney Docket Bormann 2-2-2-2-2) provides a further description of the exemplary system configuration of the distributed switch shown in FIG. 2 and is incorporated by reference herein.

Sparing Cell 13 can present distributed switch elements such as the distributed call processors 120, distributed signaling processors 121, distributed administrative processors 122, distributed gateway processors 123 and hub 110. Because each of the distributed switch elements can use a 2N sparing strategy, a single Sparing Cell 13 can be configured to represent any one of these switch elements with their respective spare. For example, if one processor is operative and the spare processor is inoperative, Sparing Cell 13 can provide individual status information on each individual processor.

Alternatively, the entities represented by Sparing Cell 13 need not be identical. Sparing Cell 13 can represent non-identical entities and can provide different types of status information on each individual entity.

The left and right portions of Sparing Cell 13 indicate to the user status information about the 2N sparing strategy. In other words, the status of a distributed switch element and its spare can be individually conveyed to the GUI user.

Sparing Cell 13 can be employed by a software developer to create software instructions. The software instructions that construct a GUI can be located at a local processor. A remote processor connected to that local processor can access the software instructions to construct the GUI. For example, the local processor can be a processor of a distributed network switch and the remote processor can be a workstation connected to this processor of the distributed network switch. Returning to the example of FIG. 2, a processor from distributed administrative processors 122 can act as the local processor and workstation 150 can act as the remote processor.

The software instructions created from the GUI components can be programmed in an interpreted language and can be platform independent. For example, the instructions can be programmed in the Java™ programming language by Sun Microsystems, Inc.® for a platform that includes a Java Virtual Machine (JVM). Consequently, when a remote processor having the JVM downloads the instructions, the instructions can be interpreted into machine code specific to that remote processor.

The Sparing Cell GUI component can be associated, for example, with the Java Abstract Windows Toolkit (AWT) package so that the software developer can use the Sparing Cell GUI component in conjunction with the GUI components in the Java AWT package.

Alternatively, the Sparing Cell GUI component, for example, can be modified and incorporated into Java applications, Java applets, and/or JavaScript applications. Java applications are Java programs that run standalone, i.e., do not require an applet viewer such as a Web browser like HotJavaE by Sun Microsystems, Netscape Navigator® by Netscape Communications Corp., or a separate program like Sun Microsystems' appletviewer. Java applets are embedded Java applications that run in the context of an applet viewer. JavaScript™ is a scripting language created by Sun Microsystems and Netscape Communications that scripts the Netscape Navigator browser.

Furthermore, the Sparing Cell GUI component can also be in the format of JavaBeans by Sun Microsystems. JavaBeans are reusable Java software components which can be used with a software development environment, such as Visual Cafe by Symantec Corporation. Software development environments can integrate visual and source views of the components through use of certain features such as, for example, drag-and-drop. The drag-and-drop feature allows a software developer to modify the property values associated with the GUI component while simultaneously viewing the modifications. The Sparing Cell GUI component can be incorporated with the drag-and-drop feature.

FIG. 1B lists the property settings corresponding to the Sparing Cell shown in FIG. 1A, according to an embodiment of the present invention. 1st Partial Cell Color property 1000 can be used to set the color of the first spare on the left portion of Sparing Cell 13. 2nd Partial Cell Color property 1005 can be used to set the color of the second spare on the right portion of Sparing Cell 13.

Each Sparing Cell 13 can contain up to three lines of text through the use of Label1 property 1040, Label2 property 1045, and Label3 property 1050. The example illustrated in FIG. 1A shows where Label1 1040 is set to a value of "CP01," Label2 1045 is set to a value of "ACT," and Label3 1050 is not set with a value.

The foreground color of the text displayed on the face of Sparing Cell 13 can be set by Foreground property 1030.

The size and position of Sparing Cell 13 can be set by Dimension properties: X 1010, Y 1015, Width 1020 and Height 1025. X property 1010 and Y property 1015 refer to the offset between the top, left corner of NS Sparing Cell 130 and the top, left corner of the container within which Sparing Cell 13 is located.

Highlight property 1035 can indicate whether Sparing Cell 13 should be highlighted when the user clicks Sparing Cell 13 using a mouse. Highlight property 1035 can have values of "true" or "false." When Sparing Cell 13 has a value of "true" and the user has clicked Sparing Cell 13, the border changes its color to white, thereby indicating to the user that the network switch component has been selected.

Sparing Cell 13 handles two customized events: SingleClick and DoubleClick. The SingleClick Event is generated when the mouse pointer is over Sparing Cell 13 and the user clicks the mouse once. When Highlight 1035 has a value of "true" and the SingleClick Event is triggered, the border color of Sparing Cell 13 is changed to white indicating the user has selected that Sparing Cell 13.

The DoubleClick Event is generated when the mouse pointer is over Sparing Cell 13 and the user clicks the mouse twice in rapid succession. In response to the DoubleClick Event, Sparing Cell 13 explodes the view of Sparing Cell 13 to show additional, detailed information about the distributed switch element represented by Sparing Cell 13. More specifically, the exploded view of Sparing Cell 13 displays status information in the form of GUI components that physically approximate the represented distributed switch element hardware (e.g., input/output cards); the exploded view of Sparing Cell 13 is discussed in a commonly assigned patent application entitled A METHOD AND APPARATUS FOR SUPERVISING A DISTRIBUTED PLATFORM SWITCH THROUGH GRAPHICAL REPRESENTATIONS (Attorney Docket—Borman 3-3-3-3-3) and is incorporated by reference herein. Again, the border color of Sparing Cell 13 is changed to white to indicate that the user has selected to work with this Sparing Cell 13.

Note also that at runtime any of these properties can be changed by the software developer to indicate the various state changes in the switch. For example, a switching element represented by a Sparing Cell might have certain problems, under which circumstance, the cell's left or right side might change color accordingly. Also, the labels can be changed to indicate the new state of the represented switch element.

It should, of course, be understood that while the present invention has been described in reference to particular arrangement of the Sparing Cell GUI component, other arrangements and processes should be apparent to those of ordinary skill in the art. For example, the Sparing Cell GUI component can be associated with another GUI component so that the Sparing Cell GUI component is located within the other GUI component.

What is claimed is:

1. A method for developing a graphical user interface (GUI), comprising the steps of:
   loading a sparing cell GUI component that enables display of a first interior portion of a first color corresponding to a first state information of a first entity and a second interior portion of a second color corresponding to a second state information of a second entity, wherein the second entity is a spare of the first entity; and
   associating the sparing cell GUI component with a GUI component.

2. The method of claim 1, wherein the sparing cell GUI component further includes a border of a third color surrounding the first interior portion and the second interior portion, the third color corresponding to the first state information and the second state information.

3. The method of claim 2, wherein the sparing cell GUI component further includes a label text within the border.

4. The method of claim 1, wherein the sparing cell GUI component, upon being selected by a user, accesses a GUI window displaying additional details about the first state information and the second state information.

5. The method of claim 1, further comprising the steps of:
   constructing a first plurality of instructions from the sparing cell GUI component and the GUI component associated in said associating step; and
   providing the first plurality of instructions to a remote processor.

6. The method of claim 5, further comprising the step of:
   constructing, at the remote processor, the GUI using the first plurality of instructions.

7. The method of claim 6, wherein said providing step and said constructing step further includes dynamically updating the first interior portion of the sparing cell GUI component to represent changes in the first state information of the first entity.

8. The method of claim 6, wherein said providing step and said constructing step further includes dynamically updating the second interior portion of the sparing cell GUI component to represent changes in the second state information of a second entity.

9. The method of claim 5, further comprising the step of:
   interpreting the first plurality of instructions at the remote processor to create a second plurality of instructions comprising machine codes specific to the remote processor.

10. An article of manufacture, comprising:
    a computer-readable medium having stored thereon a sparing cell GUI component that enables display of a first interior portion of a first color corresponding to a first state information of a first entity and a second interior portion of a second color corresponding to a second state information of a second entity, wherein the second entity is a spare of the first entity.

11. The article of manufacture of claim 10, wherein the computer-readable medium further has stored thereon a first plurality of instructions for enabling construction of a graphical user interface (GUI), said first plurality of instructions which, when executed by a processor, cause the first processor to:
    associate the sparing cell GUI component with a GUI component to construct a second plurality of instructions.

12. The article of manufacture of claim 10, wherein the computer-readable medium further has stored thereon a first plurality of instructions for constructing a graphical user interface (GUI) for a switch, said instructions which, when executed by a first processor, cause the first processor to:
    associate the sparing cell GUI component with a GUI component to construct a second plurality of instructions; and
    dynamically updating the sparing cell GUI to represent changes in the state information.

13. The article of manufacture of claim 10, wherein the sparing cell GUI component further includes a border of a third color surrounding the first interior portion and the second interior portion, the third color corresponding to the first state information and the second state information.

14. The article of manufacture of claim 10, wherein the sparing cell GUI component further includes a label text within the border.

15. The article of manufacture of claim 10, wherein the sparing cell GUI component, upon being selected by a user, accesses a GUI window displaying additional details about the first state information and the second state information.

16. A method for using a graphical user interface (GUI), comprising the steps of:
    receiving a first plurality of instructions that enable use of a sparing cell GUI component associated with a GUI component, the sparing cell GUI component enabling display of a first interior portion of a first color corresponding to a first state information of a first entity and a second interior portion of a second color corresponding to a second state information of a second entity, wherein the second entity is a spare of the first entity;
    interpreting the first plurality of instructions to create a second plurality of instructions comprising machine codes specific to a processor; and
    constructing the GUI from the second plurality of instructions.

17. The method of claim 16, wherein the sparing cell GUI component further includes a border of a third color surrounding the first interior portion and the second interior portion, the third color corresponding to the first state information and the second state information.

18. The method of claim 16, wherein the sparing cell GUI component further includes a label text within the border.

19. The method of claim 16, wherein the sparing cell GUI component, upon being selected by a user, accesses a GUI window displaying additional details about the first state information and the second state information.

20. An apparatus for developing a graphical user interface (GUI), comprising:
   means for loading a sparing cell GUI component that enables display of a first interior portion of a first color corresponding to a first state information of a first entity and a second interior portion of a second color corresponding to a second state information of a second entity, wherein the second entity is a spare of the first entity; and
   means for associating the sparing cell GUI component with a GUI component.

21. A computer for using a graphical user interface (GUI), comprising:
   a computer-readable memory containing:
      a state program receiving state information; and
      a GUI program enabling display of a GUI, the GUI program including a sparing cell GUI component that enables display of a first interior portion of a first color corresponding to a first state information of a first entity and a second interior portion of a second color corresponding to a second state information of a second entity, wherein the second entity is a spare of the first entity; and
   a processor connected to said computer-readable memory, said processor running the state program and the GUI program.

22. The computer of claim 21, wherein:
   said computer-readable memory further contains:
      an update program dynamically updating the sparing cell GUI component to represent changes in the first and second state information; and
   said program runs the update program.

23. The method of claim 1, wherein the first entity is a processor and the second entity is a spare processor.

24. The method of claim 1, wherein the first entity is a processor of a distributed switch and the second entity is a spare processor of a distributed switch.

* * * * *